United States Patent
Fiddy (10) Patent No.: US 8,508,338 B1
(45) Date of Patent: Aug. 13, 2013

(54) METHOD AND SYSTEM FOR DEFEAT OF REPLAY ATTACKS AGAINST BIOMETRIC AUTHENTICATION SYSTEMS

(76) Inventor: Howard Owen Fiddy, Falls Church, VA (US)

( * ) Notice: Subject to any disclaimer, the term of this patent is extended or adjusted under 35 U.S.C. 154(b) by 227 days.

(21) Appl. No.: 12/941,066

(22) Filed: Nov. 7, 2010

(51) Int. Cl.
*G10L 17/00* (2013.01)

(52) U.S. Cl.
USPC ......... 340/5.82; 713/186; 382/185; 340/5.52; 340/5.83

(58) Field of Classification Search
USPC .................. 340/5.2, 5.4, 5.41, 5.5, 5.51, 5.52, 340/5.53, 5.54, 5.55, 5.82, 5.83, 5.84, 5.85; 235/380, 382
See application file for complete search history.

(56) References Cited

U.S. PATENT DOCUMENTS

| | | | |
|---|---|---|---|
| 6,910,129 B1 | 6/2005 | Deng | |
| 6,941,001 B1 | 9/2005 | Bolle | |
| 6,957,337 B1 | 10/2005 | Chainer | |
| 6,957,339 B2 | 10/2005 | Shinzaki | |
| 6,992,562 B2 | 1/2006 | Fuks | |
| 7,027,617 B1 | 4/2006 | Frischholz | |
| 7,039,812 B2 | 5/2006 | Kawan | |
| 7,130,452 B2 | 10/2006 | Bolle | |
| 7,178,025 B2 | 2/2007 | Scheidt | |
| 7,278,024 B2 | 10/2007 | Sundararajan | |
| 7,373,515 B2 | 5/2008 | Owen | |
| 7,545,963 B2 | 6/2009 | Rowe | |
| 7,735,729 B2 | 6/2010 | Rowe | |
| 7,751,594 B2 | 7/2010 | Rowe | |
| 7,766,223 B1 | 8/2010 | Mello | |
| 2003/0046237 A1 | 3/2003 | Uberti | |
| 2004/0104266 A1* | 6/2004 | Bolle et al. | 235/382 |
| 2005/0240779 A1 | 10/2005 | Aull | |
| 2007/0008108 A1* | 1/2007 | Schurig et al. | 340/539.11 |
| 2007/0165911 A1 | 7/2007 | Baentsch | |
| 2007/0203850 A1 | 8/2007 | Singh | |
| 2011/0102142 A1* | 5/2011 | Widger et al. | 340/5.83 |
| 2013/0021249 A1* | 1/2013 | Bedworth | 345/168 |

* cited by examiner

*Primary Examiner* — Nabil Syed (57) ABSTRACT

The present invention is directed to a method and system for defeating replay attacks against biometric authentication systems by randomly prompting the subject to adjust a part of their body in some measurable way. The timing of these adjustments would be used to verify that the biometric input is coming from a live subject and not a recording. One embodiment of the design would include a commodity camera-equipped mobile device (130) connected to an authentication server (110) via the Internet (120). In this embodiment an encrypted video stream of the subject—for example his or her hand (140a)—would be established from the mobile device to the authentication server. The authentication server would generate a unique series of time delays, at which intervals a prompt—for example to extend or retract a specific finger—would be relayed from the server to the mobile device and subsequently the subject. The subject's coordinated response to these timed prompts—and only these timed prompts—would be measured by the authentication server. By comparing biometric features from the video stream—for example measurements of finger dimensions—to the known values for the subject in a database the authentication server will decide whether or not to authenticate the user.

11 Claims, 5 Drawing Sheets

METHOD AND SYSTEM FOR DEFEAT OF REPLAY ATTACKS AGAINST BIOMETRIC AUTHENTICATION SYSTEMS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application relates to biometric authentication systems, specifically those that verify the identity of an individual by measuring one or more physical attributes of a person and making a comparison to stored measurements of known persons.

2. Prior Art

Authentication, along with confidentiality and integrity, is one of the fundamental requirements of any secure system. Typically authentication is performed by one or more of three major 'factors': (1) something a user knows (e.g.—a password, pass code or pass phrase), (2) something a user has (e.g.—a physical key, card, bar code, mobile phone or certificate) and (3) something a user is (e.g.—a person's physical characteristic such as DNA, iris, hand, skin texture, voice, face, fingerprint or blood vessel patterns). These three factors are often referred to as knowledge-based, token-based and biometric-based authentication factors, respectively. Demand for multifactor authentication systems (a.k.a—'fused,' 'dual' or 'combinatoric' systems) that combine one or more of these three factors is increasing because they present a higher obstacle to criminals. Such techniques are also becoming easier to implement thanks to the wide availability of mobile phones, PDAs and other such devices. For example, modern bank web sites often send a text message to users' mobile phones containing a random code that they must type into a web form. This combines a token-based factor (i.e.—possession of the phone) with a knowledge based factor (i.e.—the standard password prompt) in a manner that is cheap enough to be widely deployed.

However, purpose-built biometric authentication hardware is not widely deployed among consumers and therefore biometrics are infrequently used over the web. Furthermore, biometric authentication systems are particularly vulnerable to replay attacks in which a criminal makes a copy of the real user's features and later presents them to the authentication device. For example, an attacker can steal a photograph of a user's eye and present it to an eye scanner, or intercept data in transit across a network and re-transmit it to the authentication server at a later date. This problem is compounded by the fact that in the web usage model the authentication system is under the physical control of the untrusted user. However, the embodiments of the present invention are not susceptible to such simple attacks and could therefore be implemented with widely deployed commodity hardware such as mobile phones, laptops, tablet computers or PDAs. This capability will enable businesses and individuals to conduct a larger fraction of their transactions over the Internet due to the improved security.

Although biometric and multifactor authentication systems exist in the prior art, none are simultaneously deployable on commodity hardware and resistant to replay attacks. All are therefore poorly suited to wide deployment over the Internet. U.S. Pat. No. 7,766,223 to Stephen M. Mello et al describes a multifactor authentication system involving voice prints for biometric factors. However, no mention is made of replay attacks and therefore the biometric factor can be defeated easily using an audio recording. In fact this patent refers to 'the' keyword or phrase used for voice authentication indicating that it is static and unchanging and therefore vulnerable to replay attacks. Furthermore voice is the only biometric authentication factor addressed. U.S. Pat. No. 7,373,515 to William N. Owen describes a multifactor authentication system but makes no mention of securing the biometric reader device or defeating replay attacks. U.S. Pat. No. 6,941,001 to Bolle et. al. describes a method for defeating replay attacks against fingerprint biometrics, but requires a 'combined pointing and fingerprint recognition device' which is rarely, if ever, available on commodity hardware due to cost. Furthermore, fingerprints are the only biometrics addressed and no claim is made upon the technique of randomly stimulated user input claimed here. In fact, the method uses a previously defined 'gestural password' which is not random and again, is therefore susceptible to replay attacks.

U.S. patent application Ser. No. 11/644,573 by Michael Baentsch et. al. asserts that there will always be natural, random fluctuations in biometric data and accordingly rejects authentication data that looks 'too close' to the expected template. The technique attempts to differentiate between malicious manipulation of an image of the subject and statistically expected variations. However, this means that the technique would be vulnerable to a stolen video of the subject, which would contain the subject's natural and therefore statistically expected movements. No discussion of resistance to video replay attacks is present in the patent.

There are several types of replay attack detection systems that rely on timestamps, 'numbers used once' (nonce) and digests (hash functions) of those values—U.S. Pat. Nos. 6,957,339 (2002), 7,178,025 (2003) and U.S. patent application Ser. Nos. 10/280,732 (2002) and 11/094,452 (2005). However, these approaches only address the security of data after it has been collected by the reader—which is inherently trusted in these architectures. No method is presented for ensuring that the person is currently alive and present at the reader. This assurance is critical for the purposes of secure web commerce since large numbers of uncontrolled devices will be used. For example, if an attacker successfully replayed an image of an iris to a scanner device utilizing nonces and timestamps, the device would generate a new nonce and timestamp for the data and blindly send it along to the authentication server.

U.S. Pat. No. 7,027,617 to Robert Frischholz describes the display of objects at random positions on a computer screen and estimating the line of sight of an eye looking at the objects to defeat replay attacks. However, the small screens of commodity mobile devices make this technique unfeasible for that important class of devices. Furthermore, eye-based techniques are the only methods addressed by the patent, and the detection of prompted blinking or finger extension is not addressed.

3. Advantages

An advantage of the method described in the present application is that randomized integrity checking is integrated with the biometric measurement itself. This is in contrast to other systems that use non-biometric factors to defeat replay attacks against the biometric factor, thus marginalizing the benefit of biometrics. The present method achieves this by prompting the user to adjust their biometric input at randomly generated time intervals, e.g.—by blinking, extending or retracting fingers, reciting prompted words, etc. These prompts are generated by the trusted authentication server, and their responses are generated by the user requesting authentication. Since both entities are external to the reader system its integrity is not critical for the system to work, making commodity mobile devices suitable as readers. The reader device essentially becomes a data capture and transport mechanism and is no more trusted than any given router on the transport network connecting the reader to the authentication server. This enables authentication in e-commerce applications to a far larger degree than in the prior art because users will be able to use equipment they already own to conduct secure transactions on the web.

Another advantage to the approach described here is that the user responses are captured by the same sensor that is used to capture the biometric data. This ensures that the person in control of the biometric feature is alive and present at the reader. This would not be the case if, for example, one was required to scan a fingerprint on a reader and subsequently respond to a random sequence of commands on a computer touch pad. The sequence of command responses could be entered by a different finger than the scanned finger.

The randomness of the user prompts ensures the integrity of the biometric authentication so that it can legitimately add security when used as one factor in a multifactor system. Systems such as U.S. Pat. No. 7,039,812 to Citicorp Development Center, Inc. that require the user to always enter a known sequence of biometric inputs would be vulnerable to replay attacks precisely because the sequence is known. Such attempts at combining knowledge based and biometric authentication factors would be vulnerable to simple replay attacks using video or other recordings.

BRIEF SUMMARY OF THE INVENTION

The present invention is directed to a method and system for defeating replay attacks against biometric authentication systems. This is achieved by randomly prompting the subject to adjust a part of their body in some measurable way. The timing of these adjustments would be used to verify that the biometric input is coming from a live subject and not a recording. One embodiment of the design would include a commodity camera-equipped mobile device connected to an authentication server via the Internet. In this embodiment an encrypted video stream of the subject—for example his or her hand—would be established from the mobile device to the authentication server. The authentication server would generate a unique series of time delays, at which intervals a prompt—for example to extend or retract a specific finger—would be relayed from the server to the mobile device and subsequently the subject. The subject's coordinated response to these timed prompts—and only these timed prompts—would be measured by the authentication server. By comparing biometric features from the video stream—for example measurements of finger dimensions—to the known values for the subject in a database the authentication server will decide whether or not to authenticate the user. This authentication would only be approved if the features match the known values and the responses to the prompts match the timing of the prompts.

DRAWINGS

Figures

The accompanying drawings are included to provide a further understanding of the invention and are incorporated in and constitute a part of the specification. The drawings illustrate several embodiments of the invention and together with the description serve to explain examples of the present invention.

REFERENCE NUMERALS

| | |
|---|---|
| 100 | authentication requester |
| 110 | authentication server |
| 120 | Internet |
| 130 | mobile device |
| 140a | hand |
| 140b | eye |
| 140c | face |
| 200-416 | flow chart steps |
| 501 | open eye |
| 502 | partially open eye |
| 503 | closed eye |
| 600 | camera |
| 602 | speaker |

DETAILED DESCRIPTION

Figure 1:
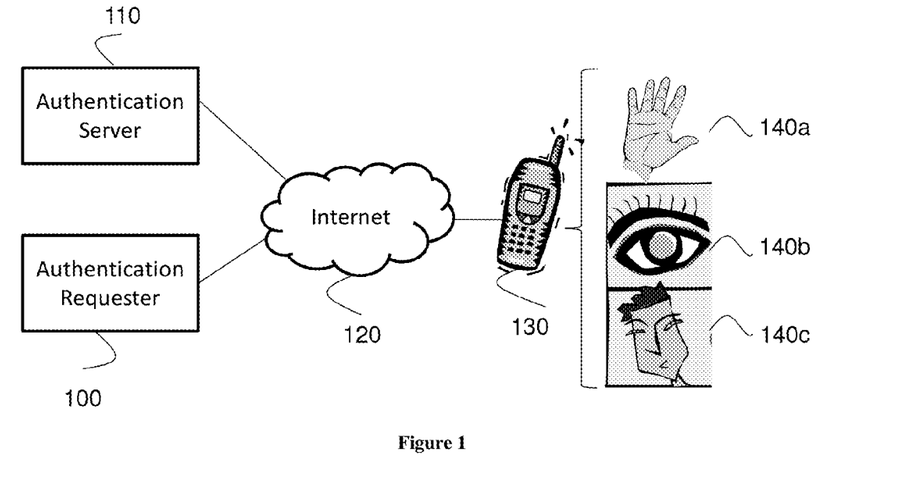
FIG. 1 shows an exemplary embodiment of an authentication system according to the present invention

FIG. 1—First Embodiment

The preferred embodiment of the invention is illustrated in FIG. 1. An Authentication Requester 100 such as an ecommerce or bank web site is connected to the Internet 120. An Authentication Server 110 implementing the method described here is also connected to the Internet. The Internet is selected as a worst case transport network for the purposes of describing this embodiment, but more secure networks would be just as suitable. Requester 100 is connected to authentication server 110 over the Internet via a secure connection (e.g.—secure socket layer connection or other secure connections known to those familiar with the art). Both the requester 100 and server 110 are also able to securely connect to a camera-equipped, Internet capable mobile device 130 as required. This secure connection is also over the Internet 120. The mobile device 130 is equipped with a speaker and an alphanumeric keypad, as well as a screen and camera of resolution typical of mobile phones currently for sale in the United States (e.g. one megapixel or better). This device need not be a mobile phone and could be a PDA, tablet computer, desktop computer, laptop computer, or any other electronic device that satisfies the characteristics outlined above. Lastly, the figure depicts three example biometric features of the user of the mobile device: the hand 140*a*, eye 140*b* and face 140*c*. This user is the subject requiring authentication by the requester 100. The authentication will be performed by the server 110 in cooperation with the mobile device 130.

Figure 2:
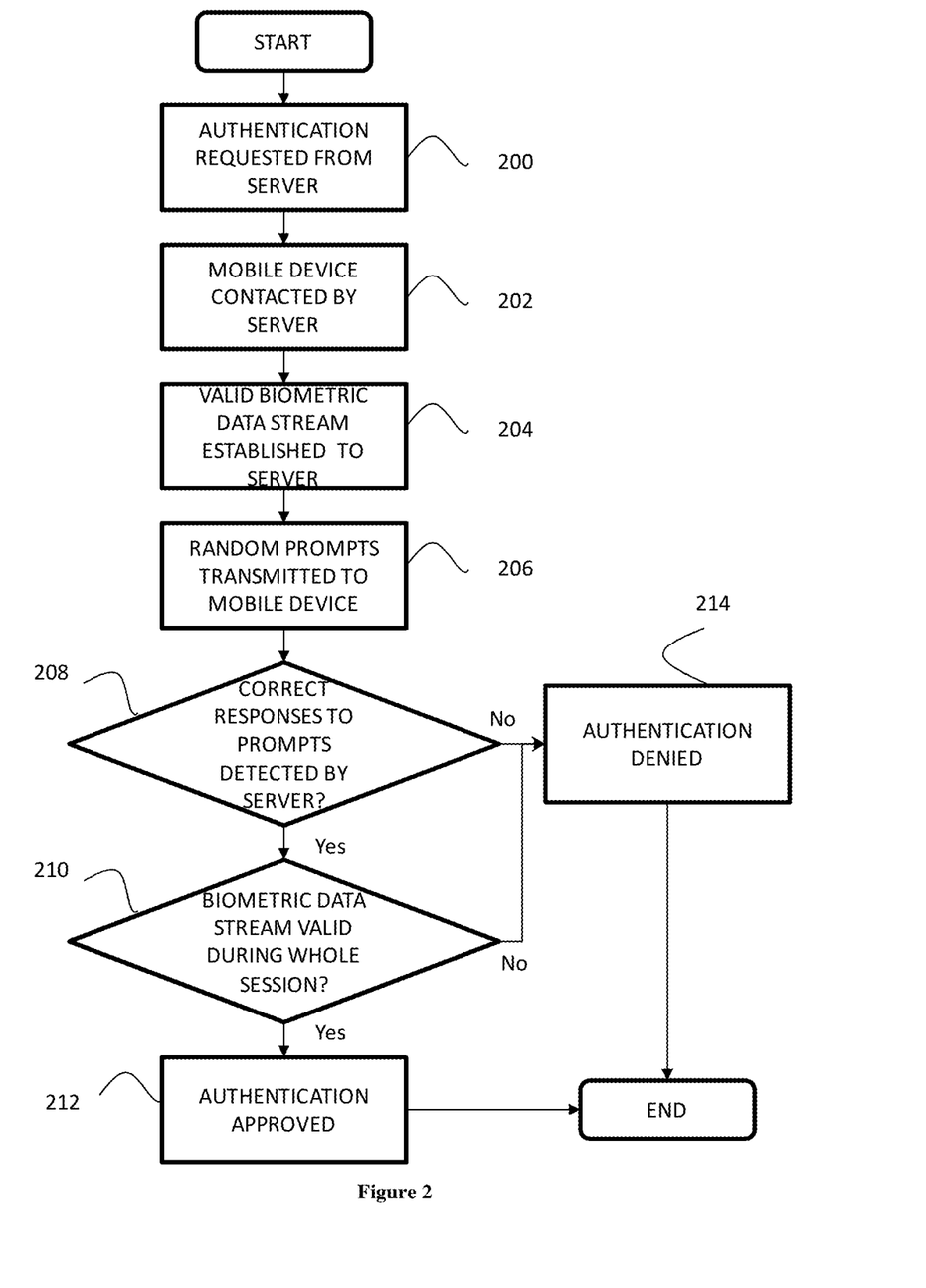
FIG. 2 is a general flow diagram of an embodiment of the present invention
Figure 3:
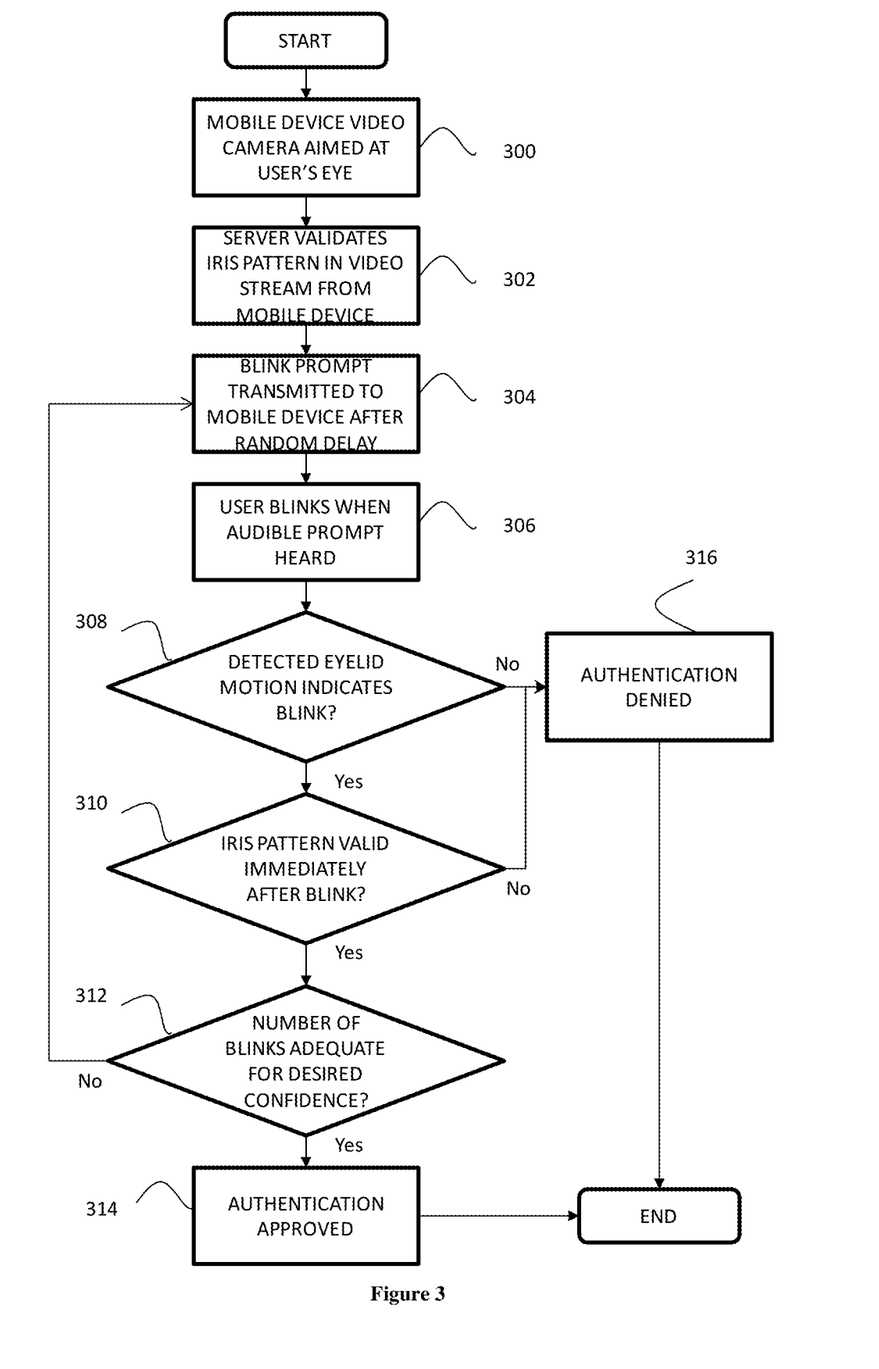
FIG. 3 is a detailed flow diagram of an exemplary embodiment of the present invention
Figure 5:
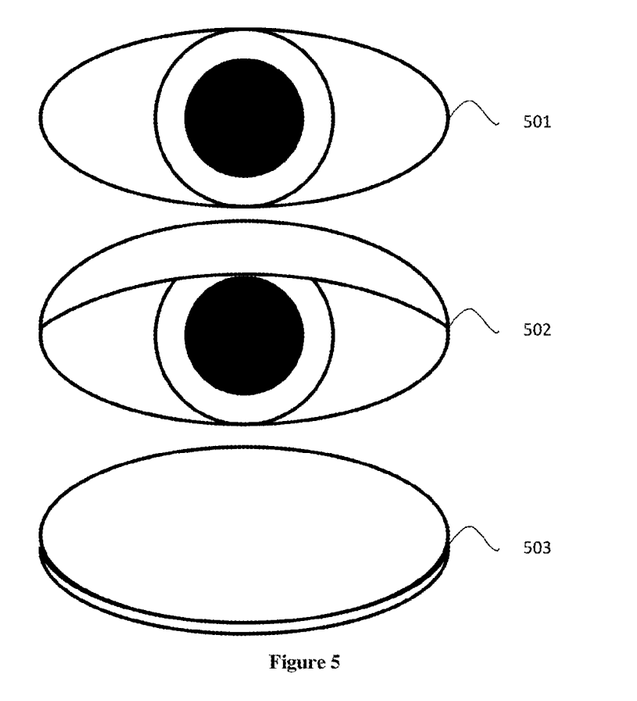
FIG. 5 is an illustration of an individual's eye in the process of closing and/or opening

FIGS. 2, 3, 5—Operation

The inventive system performs replay-attack resistant biometric authentication with the general steps shown in the flow chart of FIG. 2. The preferred embodiment using iris pattern recognition is depicted in the flow chart of FIG. 3. The user 140 is attempting to access resources on a web site, such as financial or health related data. The website determines that a biometric authentication factor is required due to the sensitivity of the transaction, or because fraud is suspected, or for some other reason. At this point the website assumes the role of Authentication Requester 100 in FIG. 1 and informs the user that biometric authentication will be required.

As represented in step 200 the requester 100 issues a request for authentication to the Authentication Server 110 over the Internet 120. The request can be issued using any secure protocol known to those skilled in the art such as Hypertext Transfer Protocol Secure (HTTPS). At a minimum, this request message will contain a unique identifier (e.g.—name, account number, id number, phone number, etc.) for the user requiring authentication. However, the message could also include the user's known valid biometric data, mobile device identifier or requirements for the level of integrity demanded. The preferred embodiment would limit the request data to an account number in order to reduce the possibility of attacks attempted by submitting false data to the server 110.

As represented by step 202, upon receiving the request the Authentication Server 110 will use the submitted unique identifier to search its records for a record of that user. In the preferred embodiment the stored record will contain the user's mobile device phone number as well as the valid biometric data for that user. The server 110 will send a message to the user's mobile device 130 if that data is found. In the preferred embodiment this message will be an ordinary Short Message Service (SMS) message and software continuously running on the mobile device 130 will automatically display an alert to the user in response. The alert will indicate that a request for biometric authentication has been received. However, on mobile devices where a continuously running application would consume undue resources, the message could alternatively prompt the user to run the biometric authentication application themselves. Additionally, devices that are directly Internet addressable such as computers and smart phones can be contacted via their Internet Protocol (IP) address.

As represented by step 204 the application running on the mobile device 130 in response to the request in step 202 will establish a secure connection to the Authentication Server 110. This application will activate the mobile device's camera and begin sending video frames to the server over that connection. In the preferred embodiment, data compression such as Lempel-Ziv-Welch (LZW) or other methods known to those skilled in the art will be used to encode the data and reduce bandwidth requirements for the mobile device link. Also, the number of image frames per second transmitted to the server and the resolution of those images will be set to a predetermined value to provide the maximum integrity possible within the limits of the device's available bandwidth. The server 110 will continuously run a biometric identification algorithm upon the incoming frames (an iris identification algorithm in the preferred embodiment, depicted in the flowchart of FIG. 3) and will categorize the data stream as 'valid' as soon as extracted details match the details on file for the user in question. Conversely, the data stream will be categorized as invalid as soon as the extracted details do not match the details on file. The categorization of the stream as valid does not indicate successful authentication by itself.

After the biometric data stream has been categorized as 'valid,' the Authentication Server 110 will transmit random prompts to the mobile device as represented by step 206. In the preferred embodiment the server 110 will use a Cryptographically Secure Random Number Generator (CSRNG) such as Blum Blum Shub or the Yarrow Algorithm to generate the random timing of these prompts in secret. A CSRNG is a random number generator that is effectively impossible for attackers to predict, although less secure random numbers may be adequate if the number of authentication attempts is limited. The delay periods need not be whole numbers, and will range from a single delay period for less demanding applications to an arbitrarily high number of delay periods for more critical applications as determined in advance. The prompts will be sent to the device in the form of trigger messages at the specified times, upon receipt of which the mobile device will prompt the user. In the preferred embodiment outlined in the flowchart of FIG. 3 the system will play the sound of a human voice speaking the word 'blink' in the appropriate language. The user will blink as instructed when he or she hears this word. Alternatively, the words 'open eye' and 'close eye' can be used as instructions.

The continuous stream of image frames from the mobile device 130 to the Authentication Server 110 will now contain variations in the user's biometric data. In the preferred embodiment this will consist of images of the eye in various states of open, transition and closed. These states are depicted in FIG. 5 as 501, 502, and 503, respectively. In step 208 the biometric authentication algorithm compares the detected time of these variations with the prompted times, taking into account the latency (delay) present in the network. The latency may be measured repeatedly using the standard 'ping' mechanism, using Network Time Protocol (NTP) or other methods known to those familiar with the art. For example, in the preferred embodiment the first blink prompt could be sent 2 seconds after the valid stream was established and the average round-trip network latency could be measured as 1 second. In that specific example the eye should be detected as closing and subsequently opening in the video frames arriving at the server 3 seconds after the valid stream was established.

Several opportunities exist to trade between the security and usability of the method at this point, best illustrated by considering the preferred embodiment (iris recognition). First, the tolerance in time between when the expected prompt should arrive and when it is observed can be adjusted. This would allow users more leeway in responding to the prompts and would subsequently reduce the likelihood of an accidental denial of authentication. However, in the preferred embodiment it would also increase the odds that a video of the real user's eye with random blinks (e.g.—captured from a previous authentication and replayed to the phone) would successfully authenticate. Second, methods such as that published by Bourennane et. al. in the Journal of Electronic Imaging 19(3), (July-September 2010) are able to make estimates of eyelid position. By monitoring the changing position of the eyelid this data can be used to ensure that a static picture of the subject's eye is not merely obscured by a user's hand at the prescribed intervals. This would come at the expense of additional processing requirements. Furthermore, since the algorithm must not be susceptible to replayed videos containing an extremely high number of blinks, a predetermined limit must be set on the number of unprompted blinks tolerated for a successful authentication. Most subjects blink uncontrollably to a certain degree, so again a tradeoff must be established here between integrity and usability; or more rigorously, the probability of detection and the probability of false alarm. Finally, a predetermined limit must be set on the allowed duration of a blink since the validity of the iris pattern data is not measurable during the time the eye is closed.

An additional benefit to using a central remotely located Authentication Server 110 is that actual biometric data streams can be stored by the server 110 and periodically audited to search for inventive attempts at subversion. Statistics from different data streams can also be compared automatically to search for identical, replayed data. Furthermore, improvements to the algorithm can be implemented in the server 110 so that all connecting devices immediately enjoy the benefits.

If the appropriate prompt responses are not detected in step 208, the system will deny authentication as represented by step 214, informing both the user and the Authentication Requester 100 of the fact and closing the session. In contrast, if the appropriate prompts are detected the system will then verify that the biometric data stream was valid for the entirety of the session, as represented by step 210. As described earlier, the threshold criteria for validity are a predetermined but variable design parameter of the system. If these criteria are not met, the system denies authentication and proceeds to step 214 as just described.

If both the prompt appropriateness and data stream validity criteria are met then authentication is successful as represented by step 212. The Authentication Server 110 informs both the user and the Authentication Requester 100 of this fact and terminates the connection to both the requester 100 and mobile device 130. In the preferred embodiment the authentication confirmation message to the requester 100 will be digitally signed with a valid certificate in the manner known to those skilled in the art. Upon receipt of this confirmation the requester 100 can proceed with allowing the user to access the desired resources.

The primary embodiment of this general method is depicted in the detailed flowchart of FIG. 3, in which the chosen biometric feature is iris pattern. The flowchart starts after the mobile device 130 is contacted in step 202 from FIG. 2. At this point in step 300 the user is instructed to aim the mobile device 130 at the user's eye. The server validates that this iris pattern matches the user's known iris pattern in step 302, and transmits the first prompt to blink at step 304. After the user blinks in step 306, the server 110 searches for the blink in the data during the allowable time window. If no blink is detected, authentication is denied in step 316. If the blink is detected the server 110 checks the validity of the iris pattern immediately after the blink denying authentication if it is not valid. In step 312 the server 110 checks that the number of blinks is adequate to meet the confidence requirements of the system, issuing more blink prompts until the criteria is met. If the criteria are met then the system will progress to step 314, approving authentication in the manner described in the discussion of step 212 above.

ADDITIONAL EMBODIMENTS

Figure 4:
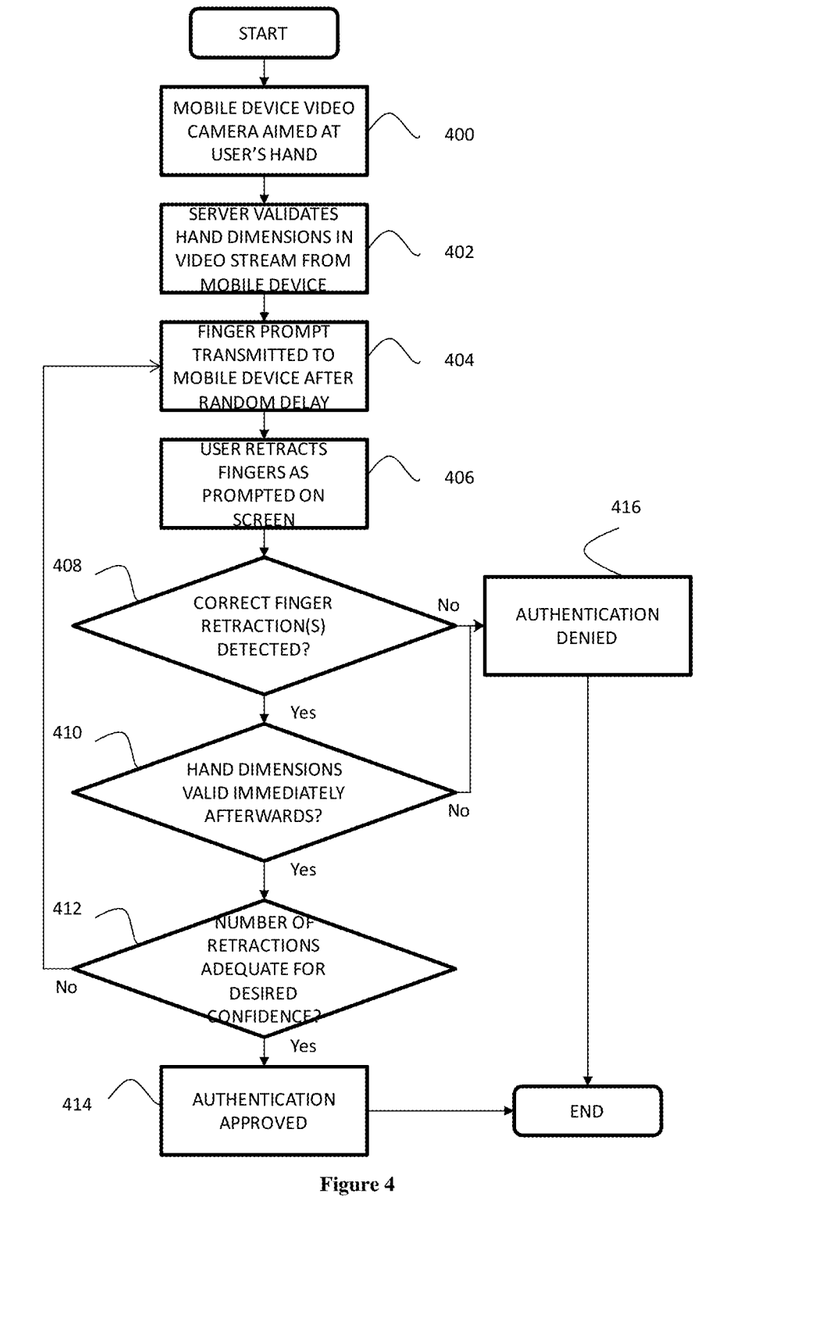
FIG. 4 is a detailed flow diagram of a second embodiment of the present invention
Figure 6:
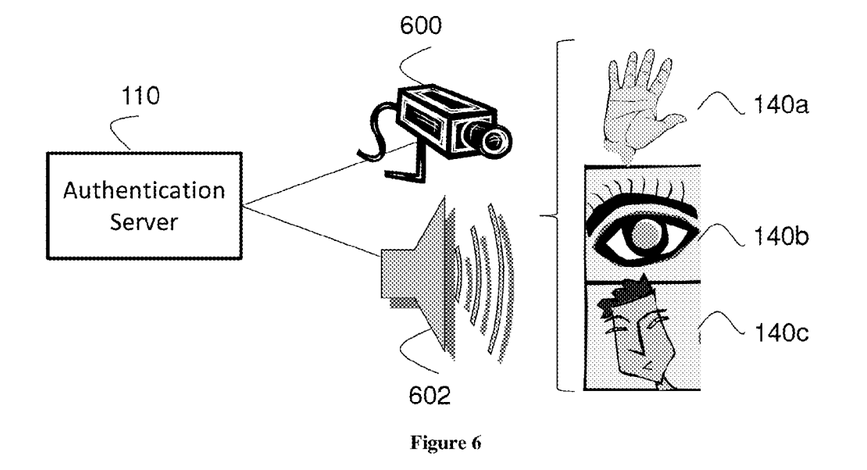
FIG. 6 shows a second exemplary embodiment of an authentication system according to the present invention

Additional embodiments are shown in FIG. 4 and FIG. 6. In FIG. 4 the system measures the position of a person's hand 140*a* in response to prompts rather than eyelid position. This embodiment uses the hand dimensions rather than the iris features as the basis for biometric authentication. Instead of prompted blinking, the system will prompt the user to extend and retract specific fingers at random time intervals. Aside from the replacement of the eye 140*b* with the hand, the system operates in analogous fashion.

In FIG. 6 the Authentication Server 110 is integrated with the mobile device 130 into a single device without need for the Internet. In this embodiment the camera 600 and speaker 602 previously supplied by the mobile device 130 directly interface to the server. The advantage to this system is that it is self contained and could be installed in locations where Internet connections are undesirable or unavailable. One such example would be a door entry system in which a connection to the Internet is considered an undue security risk. In this embodiment the role of the Authentication Requester 100 is performed by user rather than a separate web site or other entity. Aside from these changes to the Internet 120, mobile device 130, and requester 100 components, the system operates in analogous fashion to the primary embodiment.

I claim:

1. A method for biometric authentication comprising:
    a. providing a mobile device which is able to initiate an authentication session and transmit a continuous, uninterrupted live stream of biometric data collected from a user to a remote server during said authentication session;
    b. providing an authentication server which is able to receive said biometric data stream, extract biometric features during said authentication session and determine whether said features were captured from the user within a predetermined confidence interval;
    c. providing a random number generator which the authentication server can use to create a unique series of time-delayed prompts for the user to alter his appearance at random time intervals during said authentication session;
    d. detecting the variations in said continuous, uninterrupted biometric data stream and comparing them to the nature and timing of said prompts during said authentication session;
    e. the authentication server determining if the user is physically present at the mobile device during said authentication session according to the continuous validity of the biometric data and the validity of the continuous, uninterrupted biometric data stream based on the elapsed time between said detecting with respect to the prompts; and
    f. measuring the duration of the elapsed time between said detecting with respect to the prompts;
    g. wherein the prompts are randomly generated at random intervals of time determined by the random number generator;
    whereby the authentication server remotely authenticates the user and terminates said authentication session upon determining the validity of the physical presence of said user at said mobile device, protecting the user from being impersonated by unauthorized users unable to predict the unique series of time-delayed prompts.

2. The method of claim 1, wherein said mobile device is stationary.

3. A machine for biometric authentication comprising:
    a. a remote server computer, initiating an authentication session;
    b. a mobile device, said mobile device capable of collecting and transmitting a continuous, uninterrupted live stream of biometric data to said remote server computer during said authentication session;

c. an authentication server, said authentication server capable of receiving said continuous, uninterrupted live stream of biometric data during said authentication session;
d. wherein said authentication server is configured to extract biometric features and continuously determine whether said features were collected from said user during said authentication session within a predetermined confidence interval;
e. a random number generator, wherein said random number generator is employed by said authentication server to prompt the user to alter his or her appearance at a unique series of random intervals during said authentication session;
f. wherein said authentication server is configured to detect the variations in said continuous, uninterrupted biometric data stream during said authentication session and compare them to the nature and timing of said prompts; and
g. wherein said authentication server is configured to determine the validity of the physical presence of said user at said mobile device according to the correctness of the response of said user in performing the action requested in said prompts during said authentication session;
h. wherein said authentication server terminates said authentication session upon determining the validity of the physical presence of said user at said mobile device.

4. The machine of claim 3, wherein said prompt provides cues to said user to perform a physical action.

5. The machine of claim 4, wherein said physical action includes one of the following: raising a digit, raising a hand, blinking, and nodding.

6. The machine of claim 3, wherein the act of the user performing the prompted action according to the randomly generated time interval provides verification via the authentication server that said user is a real person.

7. The method of claim 1, further comprising:
a. restricting the user from accessing or submitting data after the termination of the authentication session in the event that the user fails to successfully perform the actions of said unique series of time-delayed prompts at the times at which said unique series of time-delayed prompts occur.

8. The machine of claim 3, wherein the prompt to the user is a movement of one of the following: the finger of the user, the head of the user, the eyelids of the user.

9. The machine of claim 3, wherein the mobile device reporting the validity of the action to an authentication sever as a biometric data stream is communicated wirelessly.

10. The machine of claim 3, wherein the biometric data stream is encrypted.

11. The machine of claim 3, wherein the authentication server measures the communication delay between the user and the authentication server and adjusts the acceptable time interval in which the user may perform the action of the prompt to accommodate said communication delay.

* * * * *